(12) United States Patent
Meehan et al.

(10) Patent No.: US 8,448,667 B2
(45) Date of Patent: May 28, 2013

(54) MULTI-FUNCTION PULL-OUT WAND

(75) Inventors: Steven Kyle Meehan, Fishers, IN (US);
Timothy J. Sailors, Jr., Westfield, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 848 days.

(21) Appl. No.: 12/581,817

(22) Filed: Oct. 19, 2009

(65) Prior Publication Data
US 2011/0088784 A1    Apr. 21, 2011

(51) Int. Cl.
*F16K 35/14*    (2006.01)
(52) U.S. Cl.
USPC .................. 137/637.1; 239/445; 239/449
(58) Field of Classification Search
USPC ........ 137/637, 637.1, 801; 239/391, 443–449
See application file for complete search history.

(56) References Cited

U.S. PATENT DOCUMENTS

| | | |
|---|---|---|
| 603,144 A | 4/1898 | Kellerman et al. |
| 1,123,189 A | 12/1914 | Moore et al. |
| 1,647,983 A | 11/1927 | Bloch |
| 2,314,071 A | 3/1943 | Bucknell et al. |
| 2,416,747 A | 3/1947 | Geimer |
| 2,566,878 A | 9/1951 | Fahrenkrog et al. |
| 2,567,176 A | 9/1951 | Ballard |
| 2,584,943 A | 2/1952 | Thomas |
| 2,956,579 A | 10/1960 | Hannaford |
| 3,144,878 A | 8/1964 | Williams |
| 3,341,132 A | 9/1967 | Parkison |
| 3,524,591 A | 8/1970 | Samuels et al. |
| 3,545,473 A | 12/1970 | Moia |
| 3,588,040 A | 6/1971 | Ward |
| 3,591,083 A | 7/1971 | O'Rear |
| 3,656,503 A | 4/1972 | Ward |
| 3,682,392 A | 8/1972 | Kint |
| 3,698,644 A | 10/1972 | Nystuen |
| 3,722,525 A | 3/1973 | Epple |
| 3,722,799 A | 3/1973 | Rauh |
| 3,762,648 A | 10/1973 | Deines et al. |
| 3,768,735 A | 10/1973 | Ward |
| 3,786,995 A | 1/1974 | Manoogian et al. |

(Continued)

FOREIGN PATENT DOCUMENTS

| | | |
|---|---|---|
| CA | 2 437 357 | 2/2005 |
| DE | 3306947 | 8/1984 |

(Continued)

OTHER PUBLICATIONS

Merriam-Webster online dictionary, http://www.merriam-webster.com/dictionary/wand, Aug. 28, 2012.*

(Continued)

*Primary Examiner* — Eric Keasel
*Assistant Examiner* — R. K. Arundale
(74) *Attorney, Agent, or Firm* — Faegre Baker Daniels LLP

(57) ABSTRACT

A multi-function faucet wand configured to be removably supported by the delivery spout of a faucet. The faucet wand includes a mode control movable in response to user input from between a first position for directing water in an aerate mode, and a second position for directing water in a spray mode. A flow control is movable in response to user input from between a first position for providing a low flow rate of water, and a second position for providing a high flow rate of water.

37 Claims, 13 Drawing Sheets

U.S. PATENT DOCUMENTS

| | | | |
|---|---|---|---|
| 3,851,825 A | 12/1974 | Parkison et al. | |
| 3,876,151 A | 4/1975 | Katva | |
| 3,902,671 A | 9/1975 | Symmons | |
| 3,944,141 A | 3/1976 | Siczek | |
| 3,967,783 A | 7/1976 | Halsted et al. | |
| 4,029,119 A | 6/1977 | Klieves | |
| 4,079,891 A | 3/1978 | Kwan | |
| 4,119,276 A | 10/1978 | Nelson | |
| 4,187,986 A | 2/1980 | Petrovic | |
| 4,190,207 A | 2/1980 | Fienhold et al. | |
| 4,221,337 A | 9/1980 | Shames et al. | |
| 4,224,962 A | 9/1980 | Orszullok | |
| 4,257,460 A | 3/1981 | Paranay et al. | |
| 4,396,156 A | 8/1983 | Southworth et al. | |
| 4,398,669 A | 8/1983 | Fienhold | |
| 4,461,052 A | 7/1984 | Mostul | |
| 4,524,911 A | 6/1985 | Rozniecki | |
| 4,534,512 A | 8/1985 | Chow et al. | |
| 4,541,568 A | 9/1985 | Lichfield | |
| 4,581,707 A | 4/1986 | Millar | |
| 4,582,253 A | 4/1986 | Gerdes | |
| 4,606,370 A | 8/1986 | Geipel et al. | |
| 4,618,100 A | 10/1986 | White et al. | |
| 4,619,403 A | 10/1986 | Goldney et al. | |
| 4,629,124 A | 12/1986 | Gruber | |
| 4,650,120 A | 3/1987 | Kress | |
| 4,666,085 A | 5/1987 | Liaw | |
| 4,696,322 A | 9/1987 | Knapp et al. | |
| 4,703,893 A | 11/1987 | Gruber | |
| 4,733,818 A | 3/1988 | Aghnides | |
| 4,733,819 A | 3/1988 | Aghnides | |
| 4,776,517 A | 10/1988 | Heren | |
| 4,785,998 A | 11/1988 | Takagi | |
| RE32,981 E | 7/1989 | Marty | |
| 4,909,443 A | 3/1990 | Takagi | |
| 4,927,115 A | 5/1990 | Bahroos et al. | |
| 4,934,402 A | 6/1990 | Tarney et al. | |
| 4,955,546 A | 9/1990 | Liaw | |
| 4,997,131 A | 3/1991 | Heren | |
| 5,014,919 A | 5/1991 | Knapp | |
| 5,033,897 A | 7/1991 | Chen | |
| 5,052,587 A | 10/1991 | Graves | |
| 5,069,241 A | 12/1991 | Hochstrasse | |
| 5,093,943 A | 3/1992 | Wei | |
| 5,100,055 A | 3/1992 | Rokitenetz et al. | |
| 5,143,299 A | 9/1992 | Simonetti et al. | |
| 5,145,114 A | 9/1992 | Monch | |
| 5,158,234 A | 10/1992 | Magnenat et al. | |
| 5,160,092 A | 11/1992 | Rose et al. | |
| 5,172,866 A | 12/1992 | Ward | |
| 5,184,777 A | 2/1993 | Magnenat et al. | |
| 5,201,468 A | 4/1993 | Freier et al. | |
| 5,232,162 A | 8/1993 | Chih | |
| 5,255,848 A | 10/1993 | Rhodehouse | |
| 5,316,216 A | 5/1994 | Cammack et al. | |
| 5,323,968 A | 6/1994 | Kingston et al. | |
| 5,333,792 A | 8/1994 | Wang | |
| 5,348,228 A | 9/1994 | Wang | |
| 5,348,231 A | 9/1994 | Arnold et al. | |
| 5,370,314 A | 12/1994 | Gebauer et al. | |
| 5,383,604 A | 1/1995 | Boesch | |
| 5,398,872 A | 3/1995 | Joubran | |
| 5,427,318 A | 6/1995 | Lee | |
| 5,433,384 A | 7/1995 | Chan et al. | |
| 5,445,182 A | 8/1995 | Sturman et al. | |
| 5,467,927 A | 11/1995 | Lee | |
| 5,477,885 A | 12/1995 | Knapp | |
| 5,507,314 A | 4/1996 | Knapp | |
| 5,630,548 A | 5/1997 | Chih | |
| 5,634,220 A | 6/1997 | Chiu | |
| 5,647,537 A | 7/1997 | Bergmann | |
| 5,649,562 A | 7/1997 | Sturman et al. | |
| 5,662,273 A | 9/1997 | Chih | |
| 5,662,276 A | 9/1997 | Ko | |
| 5,669,558 A | 9/1997 | Ichel | |
| 5,707,011 A | 1/1998 | Bosio | |
| 5,722,597 A | 3/1998 | Guo | |
| 5,732,884 A | 3/1998 | Jauner | |
| 5,735,467 A | 4/1998 | Lee | |
| 5,743,286 A | 4/1998 | Ko | |
| 5,772,120 A | 6/1998 | Huber | |
| 5,794,854 A | 8/1998 | Yie | |
| 5,806,770 A | 9/1998 | Wang | |
| 5,806,771 A | 9/1998 | Loschelder et al. | |
| 5,813,435 A | 9/1998 | Knapp | |
| 5,823,229 A | 10/1998 | Bertrand et al. | |
| 5,829,681 A | 11/1998 | Hamel et al. | |
| 5,853,130 A | 12/1998 | Ellsworth | |
| 5,858,215 A | 1/1999 | Burchard et al. | |
| 5,873,531 A | 2/1999 | Wang | |
| 5,887,796 A | 3/1999 | Dimmer | |
| 5,906,319 A | 5/1999 | Crowl | |
| 5,918,816 A | 7/1999 | Huber | |
| 5,927,333 A | 7/1999 | Grassberger | |
| 5,937,905 A | 8/1999 | Santos | |
| 5,944,141 A | 8/1999 | Kochan et al. | |
| 5,971,299 A | 10/1999 | Loschelder et al. | |
| 5,975,429 A | 11/1999 | Jezek | |
| 5,975,432 A | 11/1999 | Han | |
| 5,984,207 A | 11/1999 | Wang | |
| 6,000,626 A | 12/1999 | Futo et al. | |
| 6,000,637 A | 12/1999 | Duncan | |
| 6,007,003 A | 12/1999 | Wang | |
| 6,016,975 A | 1/2000 | Amaduzzi | |
| 6,045,062 A | 4/2000 | Bosio | |
| 6,059,200 A | 5/2000 | Chou | |
| 6,076,743 A | 6/2000 | Fan | |
| 6,085,790 A | 7/2000 | Humpert et al. | |
| 6,093,313 A | 7/2000 | Bovaird et al. | |
| 6,129,294 A | 10/2000 | Hsin-Fa | |
| 6,145,757 A | 11/2000 | Knapp | |
| 6,151,729 A | 11/2000 | Yean | |
| 6,158,152 A | 12/2000 | Nathenson et al. | |
| 6,164,566 A | 12/2000 | Hui-Chen | |
| 6,173,910 B1 | 1/2001 | Yean | |
| 6,173,911 B1 | 1/2001 | Hui-Chen | |
| 6,179,130 B1 | 1/2001 | Nguyen et al. | |
| 6,216,965 B1 | 4/2001 | Chao | |
| 6,220,297 B1 | 4/2001 | Marty et al. | |
| 6,230,989 B1 | 5/2001 | Haverstraw et al. | |
| 6,234,192 B1 | 5/2001 | Esche et al. | |
| 6,247,654 B1 | 6/2001 | Kuo | |
| D445,874 S | 7/2001 | Czerwinski, Jr. et al. | |
| 6,254,016 B1 | 7/2001 | Chao | |
| 6,260,772 B1 | 7/2001 | Hennemann, Jr. et al. | |
| 6,260,774 B1 | 7/2001 | Erickson | |
| 6,290,147 B1 | 9/2001 | Bertrand et al. | |
| 6,296,011 B1 | 10/2001 | Esche et al. | |
| 6,302,339 B1 | 10/2001 | Chou | |
| 6,305,619 B1 | 10/2001 | Thurn | |
| 6,325,930 B2 | 12/2001 | Farley | |
| 6,341,738 B1 | 1/2002 | Coles | |
| 6,360,967 B1 | 3/2002 | Schorn | |
| 6,367,710 B2 | 4/2002 | Fan | |
| 6,367,711 B1 | 4/2002 | Benoist | |
| 6,368,503 B1 | 4/2002 | Williamson et al. | |
| 6,370,713 B2 | 4/2002 | Bosio | |
| 6,382,529 B1 | 5/2002 | Wu | |
| 6,415,958 B1 | 7/2002 | Donley | |
| 6,427,931 B1 | 8/2002 | Guo | |
| 6,431,468 B1 | 8/2002 | Brown et al. | |
| 6,454,186 B2 | 9/2002 | Haverstraw et al. | |
| 6,454,187 B1 | 9/2002 | Wang | |
| 6,460,782 B1 | 10/2002 | Wang | |
| 6,467,104 B1 | 10/2002 | Shieh | |
| 6,471,141 B2 | 10/2002 | Smith et al. | |
| 6,484,953 B2 | 11/2002 | Frier | |
| 6,502,768 B2 | 1/2003 | Chang | |
| 6,508,415 B2 | 1/2003 | Wang | |
| 6,520,427 B1 | 2/2003 | Chen | |
| 6,540,159 B1 | 4/2003 | Wang | |
| 6,540,163 B1 | 4/2003 | Huang | |
| 6,557,785 B1 | 5/2003 | Knapp | |
| 6,561,210 B2 | 5/2003 | Hsieh et al. | |
| 6,561,441 B1 | 5/2003 | Hsieh | |
| 6,568,605 B1 | 5/2003 | Chen | |
| 6,575,387 B1 | 6/2003 | Baker | |

| | | |
|---|---|---|
| 6,592,057 B1 | 7/2003 | Ericksen et al. |
| 6,595,440 B2 | 7/2003 | Moriarty et al. |
| 6,612,507 B1 | 9/2003 | Meyer et al. |
| 6,619,567 B1 | 9/2003 | Ouyoung |
| 6,622,945 B1 | 9/2003 | Wu |
| 6,631,859 B2 | 10/2003 | Schmidt |
| 6,634,573 B2 | 10/2003 | Bosch et al. |
| 6,641,060 B2 | 11/2003 | Brattoli et al. |
| 6,641,061 B1 | 11/2003 | Hsieh |
| 6,644,333 B2 | 11/2003 | Gloodt |
| 6,659,373 B1 | 12/2003 | Heren et al. |
| 6,663,022 B1 | 12/2003 | Baker |
| 6,685,110 B2 | 2/2004 | Wang et al. |
| 6,691,933 B1 | 2/2004 | Bosio |
| 6,691,937 B2 | 2/2004 | Heren et al. |
| 6,715,699 B1 | 4/2004 | Greenberg et al. |
| 6,719,219 B1 | 4/2004 | Wang |
| 6,738,996 B1 | 5/2004 | Malek et al. |
| 6,739,523 B2 | 5/2004 | Haverstraw et al. |
| 6,742,725 B1 | 6/2004 | Fan |
| 6,749,135 B2 | 6/2004 | Groblebe et al. |
| 6,757,921 B2 | 7/2004 | Esche |
| 6,796,515 B2 | 9/2004 | Heren et al. |
| 6,808,130 B1 | 10/2004 | Ouyoung |
| 6,808,131 B2 | 10/2004 | Bosio |
| 6,811,099 B2 | 11/2004 | Krestine et al. |
| 6,860,438 B1 | 3/2005 | Huang |
| 6,866,208 B2 | 3/2005 | Kao |
| 6,880,768 B2 | 4/2005 | Lau |
| 6,915,967 B1 | 7/2005 | Chen |
| 6,921,032 B2 | 7/2005 | Habermacher et al. |
| 6,938,837 B2 | 9/2005 | Nelson et al. |
| 6,945,474 B1 | 9/2005 | Chen |
| 6,951,286 B2 | 10/2005 | Mueller et al. |
| 6,962,298 B1 | 11/2005 | Martin |
| 6,981,661 B1 | 1/2006 | Chen |
| 7,000,626 B1 | 2/2006 | Cress |
| 7,000,854 B2 | 2/2006 | Malek et al. |
| 7,134,614 B2 | 11/2006 | Miyake et al. |
| 7,320,442 B2 | 1/2008 | Bosio |
| 7,328,858 B2 | 2/2008 | Bosio |
| 7,331,536 B1 | 2/2008 | Zhen et al. |
| 7,341,239 B2 | 3/2008 | Hodel et al. |
| 7,344,095 B1 | 3/2008 | Hsu |
| 7,380,731 B1 | 6/2008 | Hsu |
| 7,494,074 B2 | 2/2009 | Benstead |
| 7,607,588 B2 * | 10/2009 | Nobili ............................. 239/68 |
| 7,871,020 B2 * | 1/2011 | Nelson et al. ................. 239/445 |
| 7,909,269 B2 * | 3/2011 | Erickson et al. ............. 239/449 |
| 2001/0020302 A1 | 9/2001 | Bosio |
| 2001/0023901 A1 | 9/2001 | Haverstraw et al. |
| 2002/0185553 A1 | 12/2002 | Benstead et al. |
| 2002/0190141 A1 | 12/2002 | Huang |
| 2003/0042331 A1 | 3/2003 | Lu |
| 2003/0042337 A1 | 3/2003 | Liang et al. |
| 2003/0125842 A1 | 7/2003 | Chang et al. |
| 2003/0127541 A1 | 7/2003 | Marino |
| 2003/0173423 A1 | 9/2003 | Haenlein et al. |
| 2003/0189111 A1 | 10/2003 | Heren et al. |
| 2004/0010848 A1 | 1/2004 | Esche |
| 2004/0088786 A1 | 5/2004 | Malek et al. |
| 2004/0112985 A1 | 6/2004 | Malek et al. |
| 2004/0124281 A1 | 7/2004 | Leung |
| 2004/0155460 A1 | 8/2004 | Nobili |
| 2004/0164183 A1 | 8/2004 | Nobili |
| 2004/0173688 A1 | 9/2004 | Gloodt |
| 2004/0217209 A1 | 11/2004 | Bui |
| 2004/0222320 A1 | 11/2004 | Wu |
| 2004/0227014 A1 | 11/2004 | Williams et al. |
| 2004/0250851 A1 | 12/2004 | Clark |
| 2004/0255377 A1 | 12/2004 | Mueller et al. |
| 2005/0098661 A1 | 5/2005 | Lev |
| 2005/0103897 A1 | 5/2005 | Cannon et al. |
| 2005/0121542 A1 | 6/2005 | Su Lim |
| 2005/0125890 A1 | 6/2005 | Zhadanov et al. |
| 2005/0145554 A1 | 7/2005 | Cunningham et al. |
| 2005/0161533 A1 | 7/2005 | Nobili |
| 2005/0178857 A1 | 8/2005 | Roman |
| 2005/0178858 A1 | 8/2005 | Roman |
| 2005/0189438 A1 | 9/2005 | Bosio |
| 2005/0205697 A1 | 9/2005 | Lo |
| 2005/0242210 A1 | 11/2005 | Heren et al. |
| 2005/0279864 A1 | 12/2005 | Fan |
| 2005/0284967 A1 | 12/2005 | Korb et al. |
| 2006/0016912 A1 | 1/2006 | Nobili |
| 2006/0022071 A1 | 2/2006 | Burnworth et al. |
| 2006/0043214 A1 | 3/2006 | Macan et al. |
| 2006/0117477 A1 | 6/2006 | Rosko |
| 2006/0214016 A1 | 9/2006 | Erdely et al. |
| 2006/0255167 A1 | 11/2006 | Vogel et al. |
| 2007/0018019 A1 * | 1/2007 | Nobili ........................ 239/581.1 |
| 2007/0170284 A1 | 7/2007 | Nelson et al. |
| 2007/0194148 A1 | 8/2007 | Rosko et al. |
| 2007/0221757 A1 | 9/2007 | Malek et al. |
| 2008/0105764 A1 * | 5/2008 | Jianglin et al. ................ 239/526 |
| 2008/0245897 A1 | 10/2008 | Nobili |

FOREIGN PATENT DOCUMENTS

| | | |
|---|---|---|
| DE | 3643320 | 7/1988 |
| EP | 0 251 990 | 1/1988 |
| EP | 0 337 367 | 10/1989 |
| EP | 0 809 539 | 12/1997 |
| EP | 0 933 136 | 8/1999 |
| EP | 0 962 256 | 12/1999 |
| EP | 0 975 432 | 2/2000 |
| EP | 1 132 141 | 9/2001 |
| EP | 1 354 634 | 10/2003 |
| EP | 1 418 007 | 5/2004 |
| EP | 1 577 016 | 9/2005 |
| EP | 1 598 116 | 11/2005 |
| EP | 1 884 693 | 2/2008 |
| GB | 1 452 974 | 10/1976 |
| GB | 1 555 003 | 11/1979 |
| GB | 2 171 175 | 8/1986 |
| GB | 2 388 332 | 11/2003 |
| JP | 02-052061 | 2/1990 |
| JP | 10230192 | 9/1998 |
| JP | 11021956 | 1/1999 |
| JP | 2000027247 | 1/2000 |
| WO | WO 80/01940 | 9/1980 |
| WO | WO 86/06654 | 11/1986 |
| WO | WO 96/25237 | 8/1996 |
| WO | WO 98/46366 | 10/1998 |
| WO | WO 00/32314 | 6/2000 |
| WO | WO 2004/104305 | 12/2004 |
| WO | WO 2005/018814 | 3/2005 |
| WO | WO 2005/115554 | 12/2005 |

OTHER PUBLICATIONS

Merriam-Webster online dictionary, http://www.merriam-webster.com/dictionary/faucet, Aug. 27, 2012.*

Price Pfister 534 Series—Single Control Pullout Kitchen Faucet installation instructions, Feb. 25, 3008, 17 pgs., Black & Decker.

* cited by examiner

MULTI-FUNCTION PULL-OUT WAND

BACKGROUND AND SUMMARY OF THE INVENTION

The present invention relates to a faucet sprayheads and, more particularly, to faucet sprayheads that are extendable from a delivery spout.

It is known to provide faucets with pull-out sprayheads or wands connected to flexible water supply tubes. Such pull-out wands often provide multiple delivery modes including a spray mode and a stream mode. In the spray mode, water is discharged from a plurality of outlets in a spray pattern. In the stream mode, water is discharged in a single, relatively concentrated stream.

According to an illustrative embodiment of the present disclosure, a multi-function faucet wand includes a waterway having an inlet passageway, a first outlet passageway, and a second outlet passageway. A mode control includes a valve operably coupled to the waterway and movable in response to user input from a first position for directing water to the first outlet passageway in a stream mode for discharging a stream of water, to a second position for directing water to the second outlet passageway in a spray mode for discharging a spray of water. A flow control includes a valve operably coupled to the waterway and movable in response to user input from a first position for providing a first flow rate of water to the mode control, to a second position for providing a second flow rate of water to the mode control, the first flow rate being less than the second flow rate. The valve of the flow control is movable to the second position for providing the second flow rate of water only when the valve of the mode control is in the first position for discharging a stream of water.

According to a further illustrative embodiment of the present disclosure, a multi-function faucet wand includes a waterway having a mode chamber and a flow chamber, and a mode control valve operably coupled to the mode chamber. The mode control valve is configured to allow a user to manually select between a stream mode for discharging a stream of water, and a spray mode for discharging a spray of water. A flow control valve is operably coupled to the flow chamber and is configured to allow a user to manually select one of a high flow rate and a low flow rate. The flow control valve is biased to the low flow rate in the absence of water pressure within the flow chamber.

According to another illustrative embodiment of the present disclosure, a multi-function faucet wand includes a waterway, a mode control including a mode control valve supported for movement relative to the waterway, a first input portion, and a second input portion. User input at the first input portion positions the mode control valve in a first position for discharging a stream of water, and user input at a second input portion positions the mode control valve at a second position for discharging a spray of water. A flow control is fluidly coupled to the mode control and includes a flow control valve supported for movement relative to the waterway, and a third input portion. User input at the third input portion is configured to move the flow control valve from a first position for providing a first flow rate of water, to a second position for providing a second flow rate of water, the first flow rate being less than the second flow rate. An interlock is operably coupled to the mode control valve and the flow control valve, and is configured to limit the flow control valve to only the first position for providing the first flow rate of water when the mode control valve is in the second position for discharging the spray of water.

According to a further illustrative embodiment of the present disclosure, a faucet includes a spout, an outlet tube received within the spout, a mixing valve fluidly coupled to the outlet tube and configured to supply to the outlet tube hot water from a hot water supply and cold water from a cold water supply, and a wand removably supported by the spout and fluidly coupled to the outlet tube. The wand includes a mode control configured to allow a user to manually select between a stream mode for discharging a stream of water and a spray mode for discharging a spray of water, and a flow control configured to allow a user to manually select an increased flow rate only when the mode control is in the stream mode.

According to another illustrative embodiment of the present disclosure, a method of controlling water flow through a faucet wand includes the steps of positioning a mode control in a first position to cause an aerated stream of water to discharge from an outlet, positioning a flow control in a first position to cause the aerated stream to discharge from the outlet at a first flow rate, moving the flow control to a second position to cause the aerated stream to discharge from the outlet at a second flow rate greater than the first flow rate, moving the mode control to a second position to cause a spray of water to discharge from the outlet, and simultaneously moving the flow control to the first position to cause the spray to discharge from the outlet at the first flow rate.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
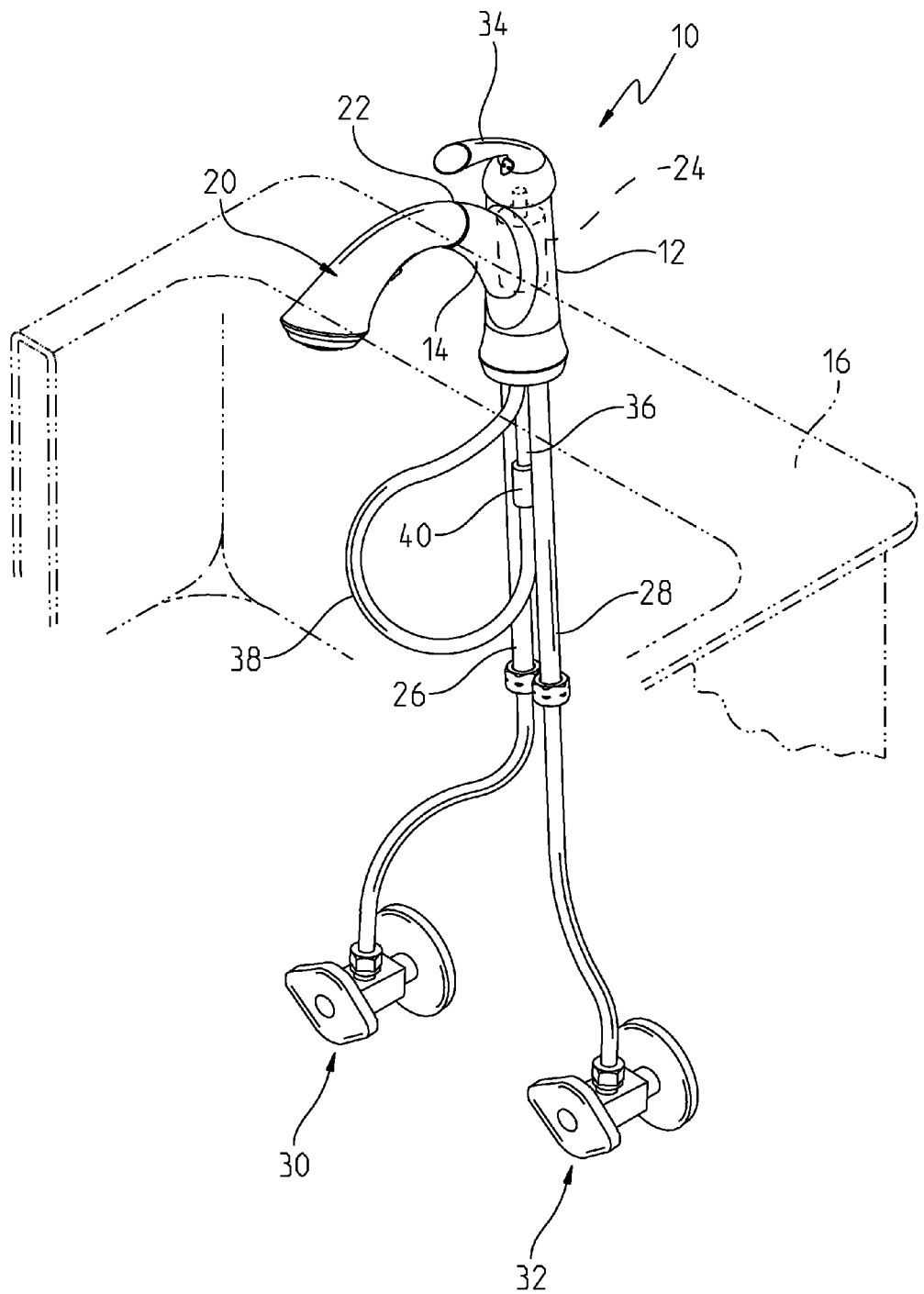
FIG. 1 is a perspective view of a faucet including a multi-function pull-out wand of the present disclosure, with the faucet shown supported by a sink deck.

Referring initially to FIG. 1, an illustrative faucet 10 is shown as including a base or hub 12 supporting a delivery spout 14 and coupled to a sink deck 16. An illustrative multi-function pull-out wand 20 is removably coupled to an outlet end 22 of the spout 14. A mixing valve 24 is illustratively supported by the hub 12 and includes a hot water inlet conduit 26 and a cold water inlet conduit 28 fluidly coupled to a hot water supply 30, illustratively a hot water stop, and a cold water supply 32, illustratively a cold water stop. The mixing valve 24 may be controlled by a user interface 34, such as a handle, to control the flow rate and temperature of water supplied by the hot and cold water inlet conduits 26 and 28 to an outlet conduit 36. The outlet conduit 36 is illustratively fluidly coupled to a flexible inlet tube 38 of the pull-out wand 20 through a conventional fitting 40.

While the following description details a pull-out wand 20 removably coupled to a delivery spout 14 for illustrative purposes, it should be appreciated that the present invention may find equal applicability with other fluid delivery devices, including with side sprayers typically used with kitchen faucets having delivery spouts mounted separately on the sink deck 16.

Figure 2:
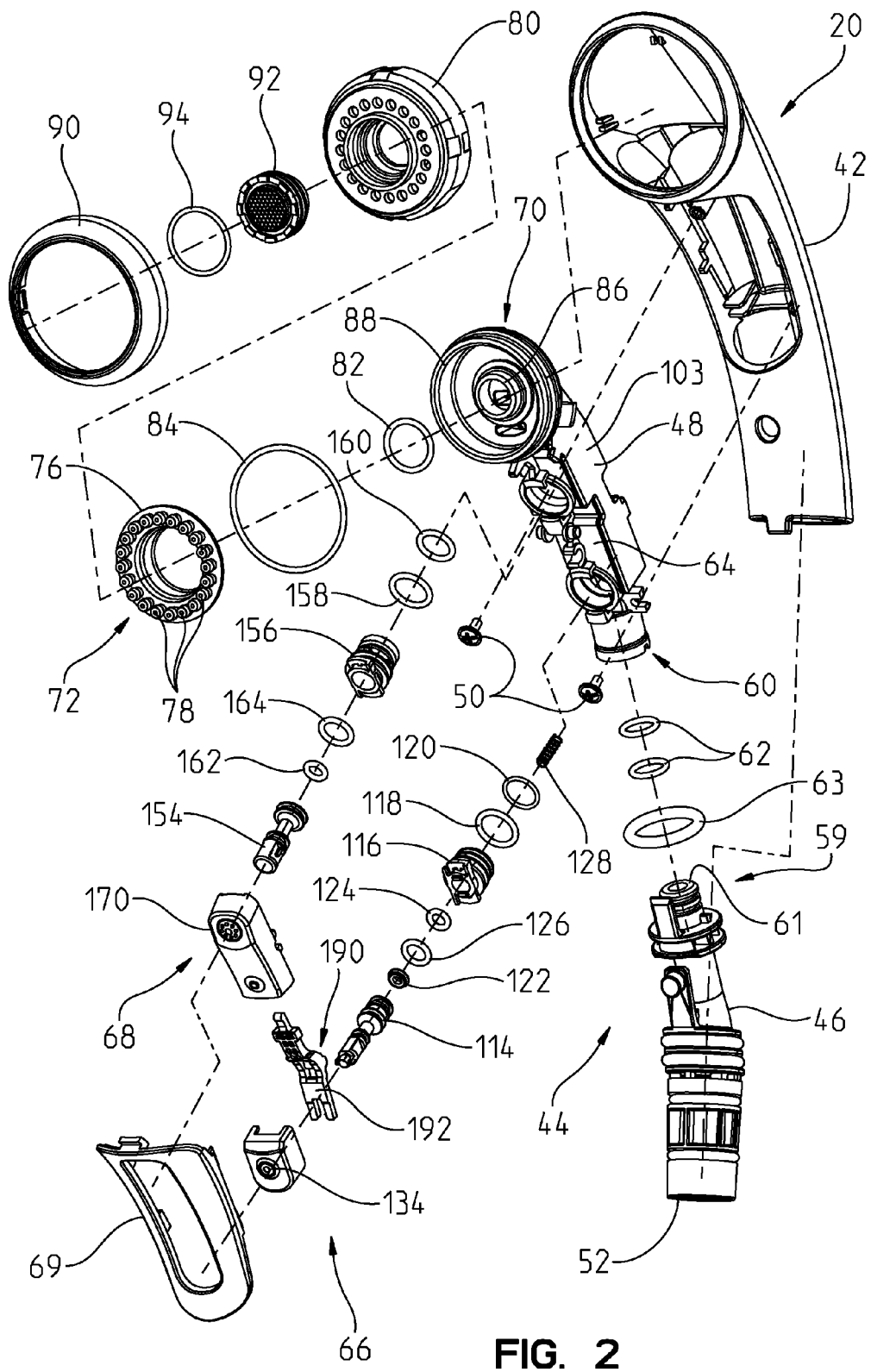
FIG. 2 is a an exploded perspective view of the multi-function pull-out wand of FIG. 1.
Figure 3:
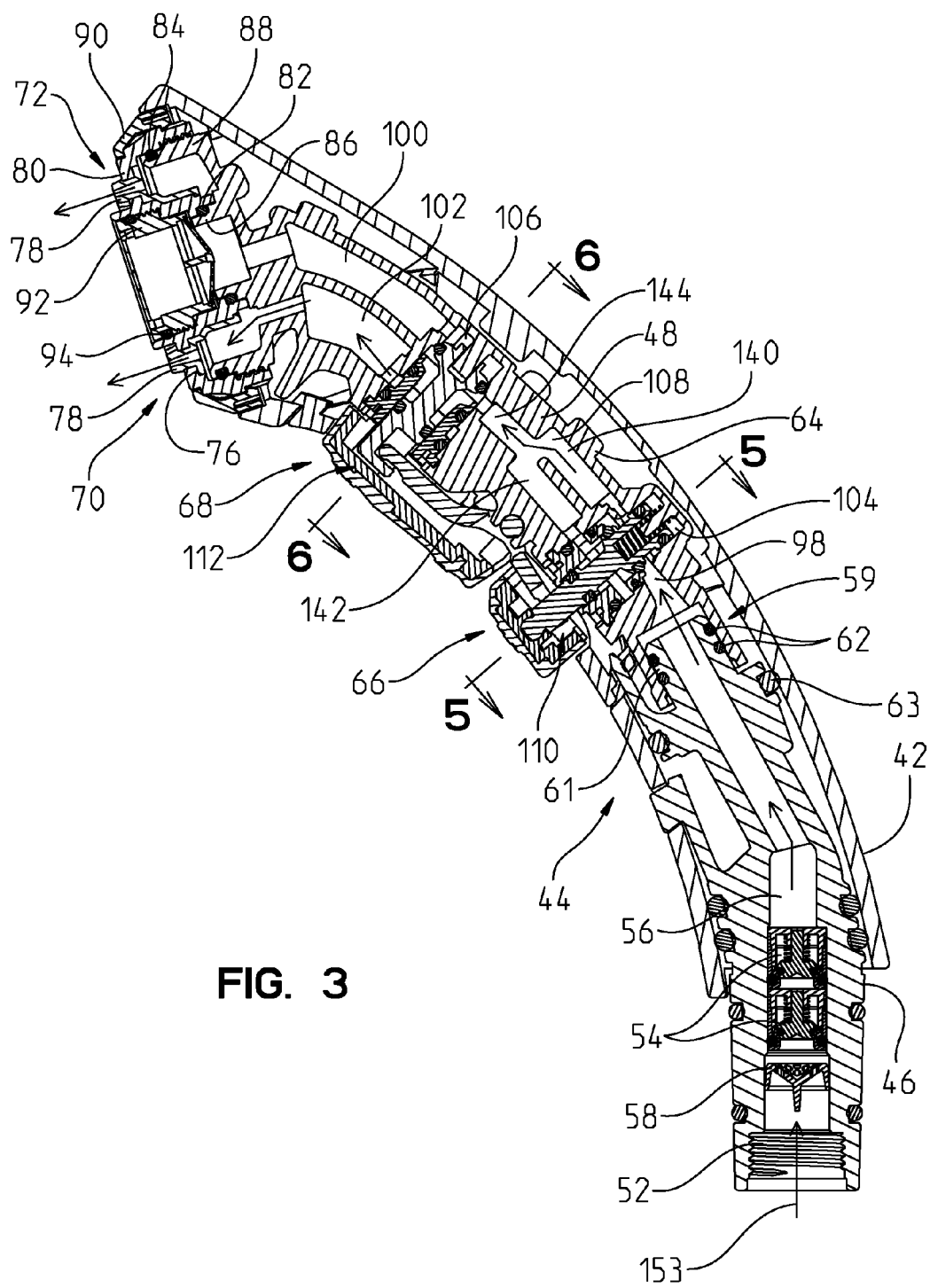
FIG. 3 is a cross-sectional view of the multi-function pull-out wand of FIG. 2.

With reference to FIGS. 2 and 3, the pull-out wand 20 illustratively includes a shell 42 receiving a waterway assembly 44. The waterway assembly 44 illustratively includes an inlet or connector waterway 46 fluidly coupled to an outlet or control waterway 48. Fasteners 50, such as screws, may couple the waterway assembly 44 to the shell 42. The connector waterway 46 illustratively includes an inlet coupling 52, such as internal threads, configured to be fluidly coupled with an outlet coupling (not shown), such as external threads, of the flexible inlet tube 38. A pair of check valves 54 (FIG. 3) are illustratively received in a fluid passageway 56 of the connector waterway 48. A screen 58 (FIG. 3) is disposed proximate the inlet coupling 52 upstream from the check valves 54 to filter debris from water passing through the passageway 56. An outlet coupling 59 of the connector waterway 46 is fluidly coupled to an upstream or inlet end 60 of the control waterway 48. Illustratively, the outlet coupling 59 includes a nipple 61 supporting seals 62, such as o-rings, and received within the inlet end 60 of waterway 48. A secondary seal 63, such as an o-ring, may be positioned intermediate the waterway 46 and the shell 42.

Figure 5:
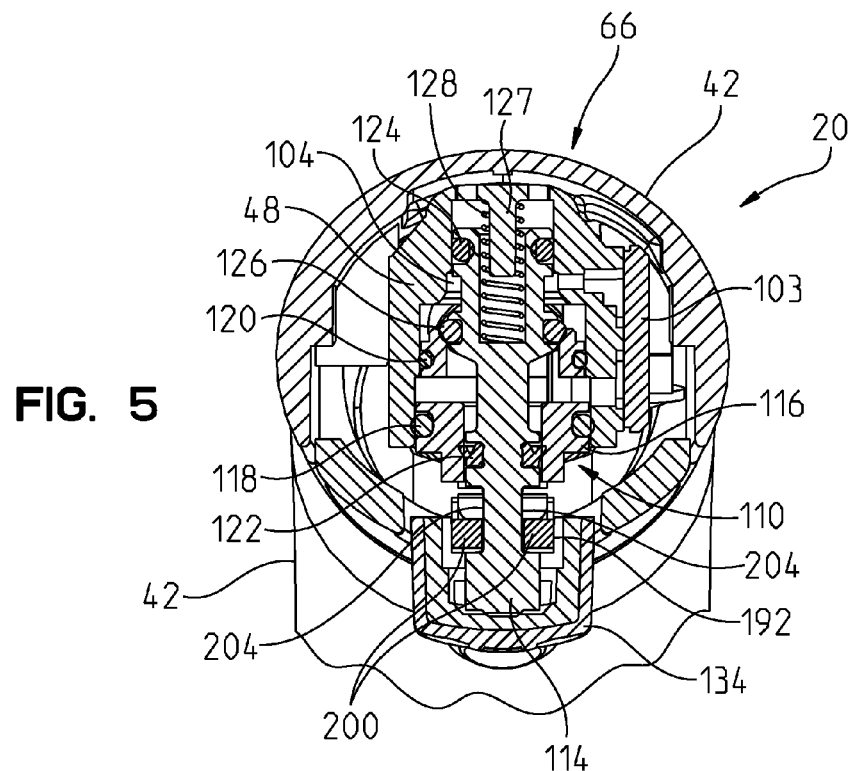
FIG. 5 is a cross-sectional view taken along line 5-5 of FIG. 3.
Figure 6:
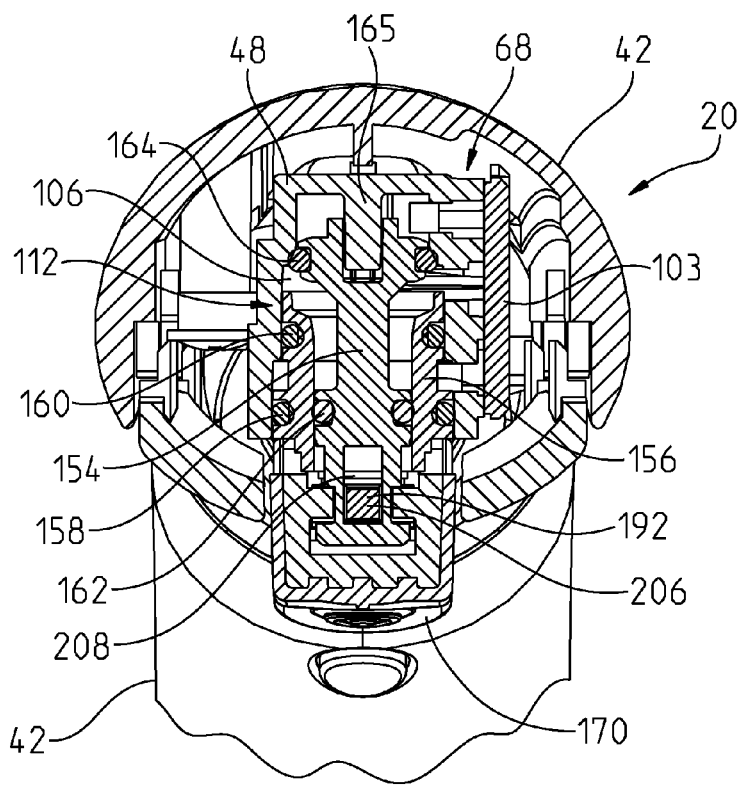
FIG. 6 is a cross-sectional view taken along line 6-6 of FIG. 3.

Illustratively, the control waterway 48 defines a valve housing 64 supporting a flow control 66 (FIGS. 3 and 5) and a mode control 68 (FIGS. 3 and 6). A cover 69 is supported by the shell 42 and receives a user interface defined by the flow control 66 and the mode control 68. The downstream or outlet end 70 of the waterway 48 is configured to receive a spray face assembly 72 including a sprayer member 76, having a plurality of circumferentially spaced outlets 78, coupled to a support member 80. Inner and outer seals 82 and 84, illustratively o-rings, may be positioned intermediate annular flanges 86 and 88 defined by the control waterway 48 and the support member 80. The support member 80 is illustratively threadably coupled to the annular flange 88, while a trim ring 90 is concentrically supported by the support member 80. An aerator 92 is concentrically received within, and threadably coupled to, the support member 80. A seal 94, illustratively an o-ring, is received intermediate the aerator 92 and the support member 80.

With reference to FIGS. 3, 4, and 7-9, the control waterway 48 illustratively includes a body 97 (FIG. 4) molded from a polymer and defining an inlet passageway 98, a first outlet passageway 100, and a second outlet passageway 102. A side plate 103 is sealingly coupled to the body 97 of the waterway 48, illustratively through ultrasonic welding, adhesives, or other similar securing means. The inlet passageway 98 is fluidly coupled to the connector waterway 46, the first outlet passageway 100 is fluidly coupled to the aerator 92, and the second outlet passageway 102 is fluidly coupled to the sprayer member 76. A flow chamber 104 is fluidly coupled to the inlet passageway 98, and a mode chamber 106 is fluidly coupled to the first outlet passageway 100 and the second outlet passageway 102. An intermediate passageway 108 is fluidly coupled between the flow chamber 104 and the mode chamber 106. A flow control valve 110 is supported by the flow chamber 104, while a mode control valve 112 is supported within the mode chamber 106.

Figure 7:
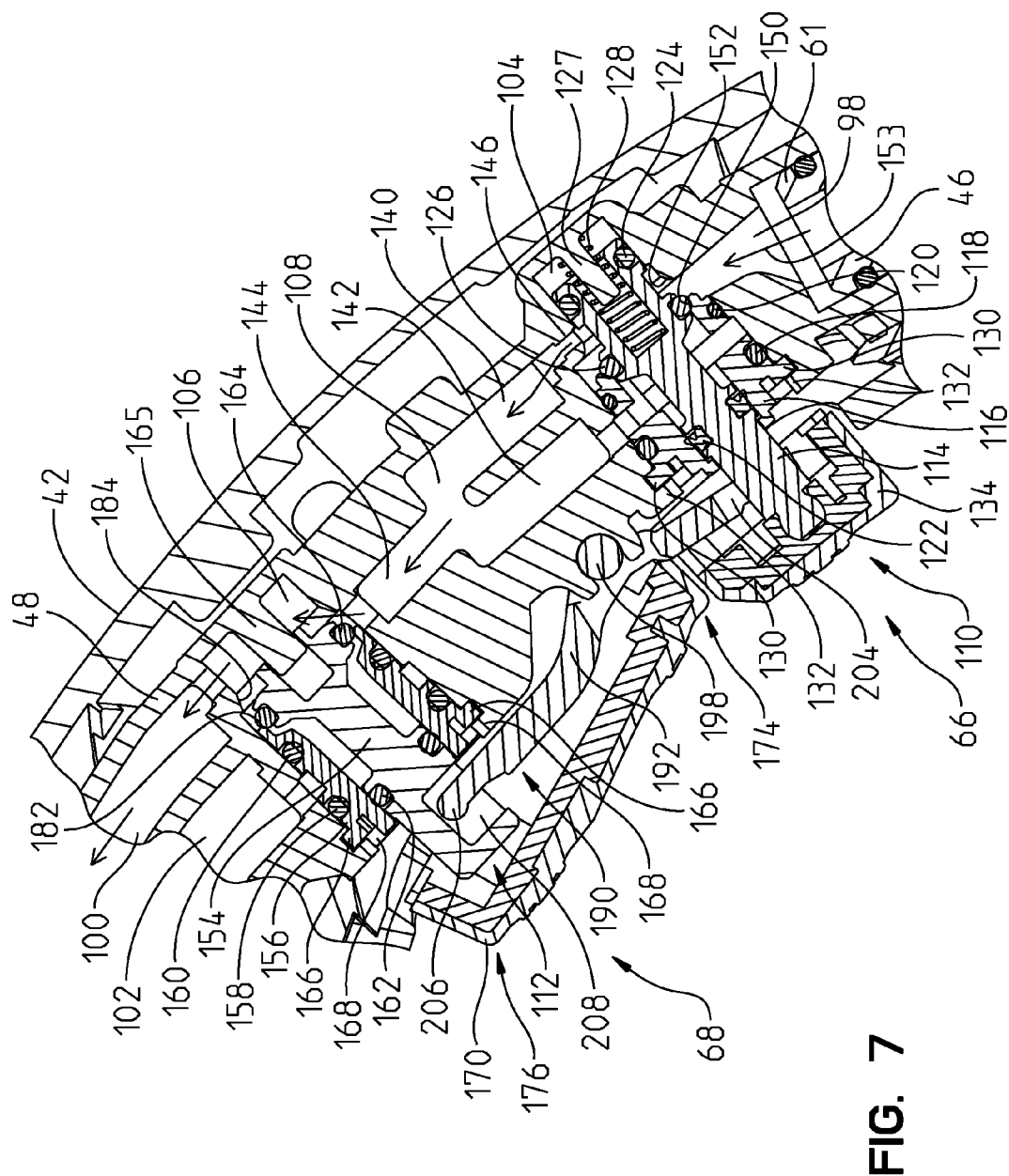
FIG. 7 is a detailed cross-sectional view of FIG. 3, the mode control piston in a first position for directing water to a first outlet conduit in a stream mode, and the flow control piston in a first position for providing a restricted first flow rate of water.
Figure 8:
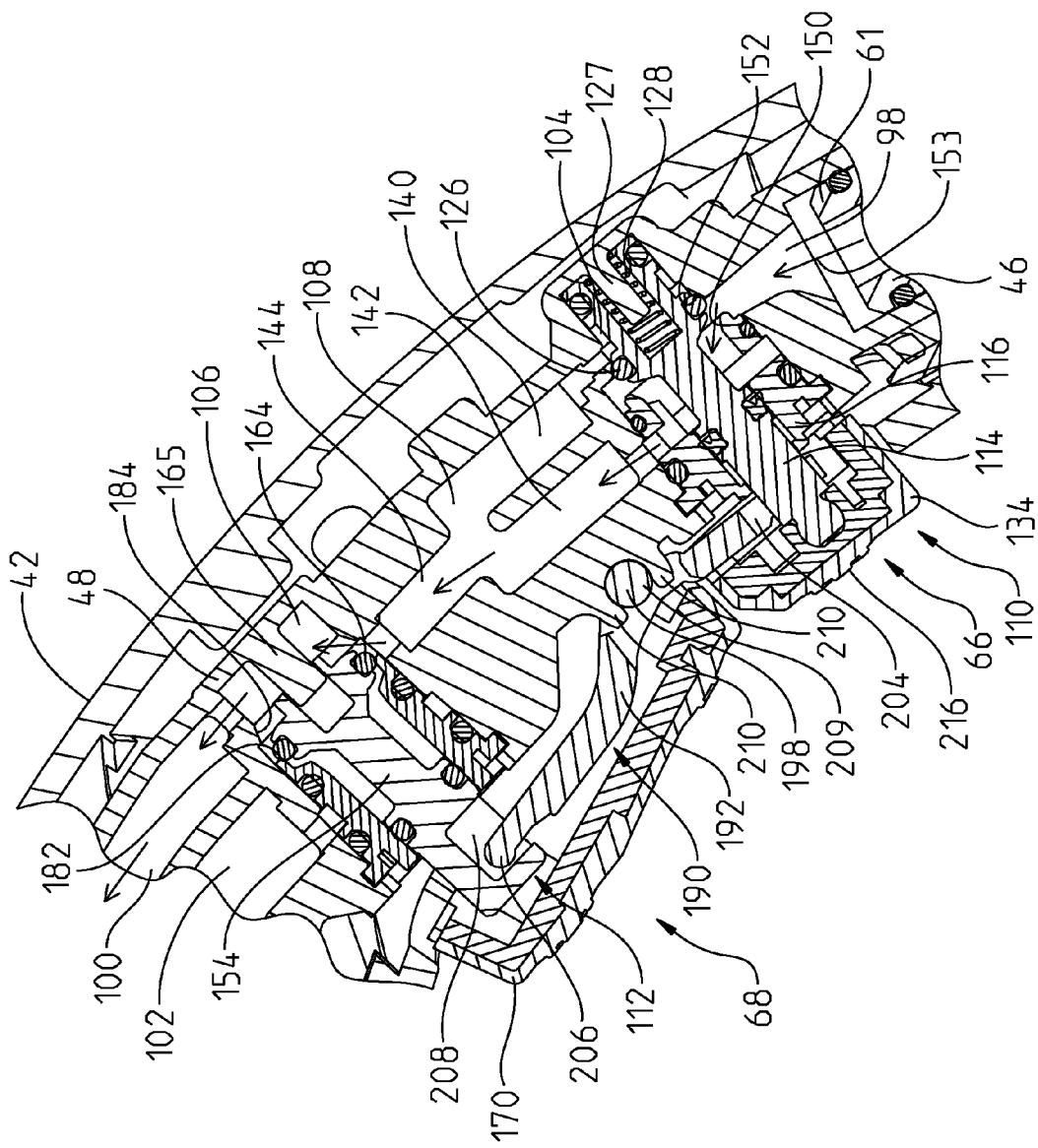
FIG. 8 is a detailed cross-sectional view similar to FIG. 7, showing the mode control piston in the first position for directing water to the first outlet conduit in the stream mode, and the flow control piston in a second position for providing a second flow rate of water.

With reference to FIGS. 5 and 7-9, the flow control valve 110 illustratively includes a flow control piston 114 secured for sliding movement within the flow chamber 104 by a retainer housing 116. The flow control piston 114 is configured to move between a first or outer position (FIGS. 7 and 9) and a second or inner position (FIG. 8). A pair of seals 118 and 120, illustratively o-rings, are positioned intermediate the retainer housing 116 and the waterway 48. A first or outer seal 122 is supported by the piston 114 for sliding movement within the retainer housing 116, while a second or inner seal 124 is supported for sliding movement within the flow chamber 104. A control seal 126 is positioned intermediate the outer seal 122 and the inner seal 124 and is configured to control fluid flow through the flow chamber 104 from the inlet passageway 98 and the intermediate passageway 108. A guide post 127 is received within the inner end of the piston 114 and provides additional support and guides movement of the piston 114 within the flow chamber 104. A spring 128 is operably coupled to the flow control piston 114 and is configured to bias the piston 114 outwardly toward the first position.

Figure 4:
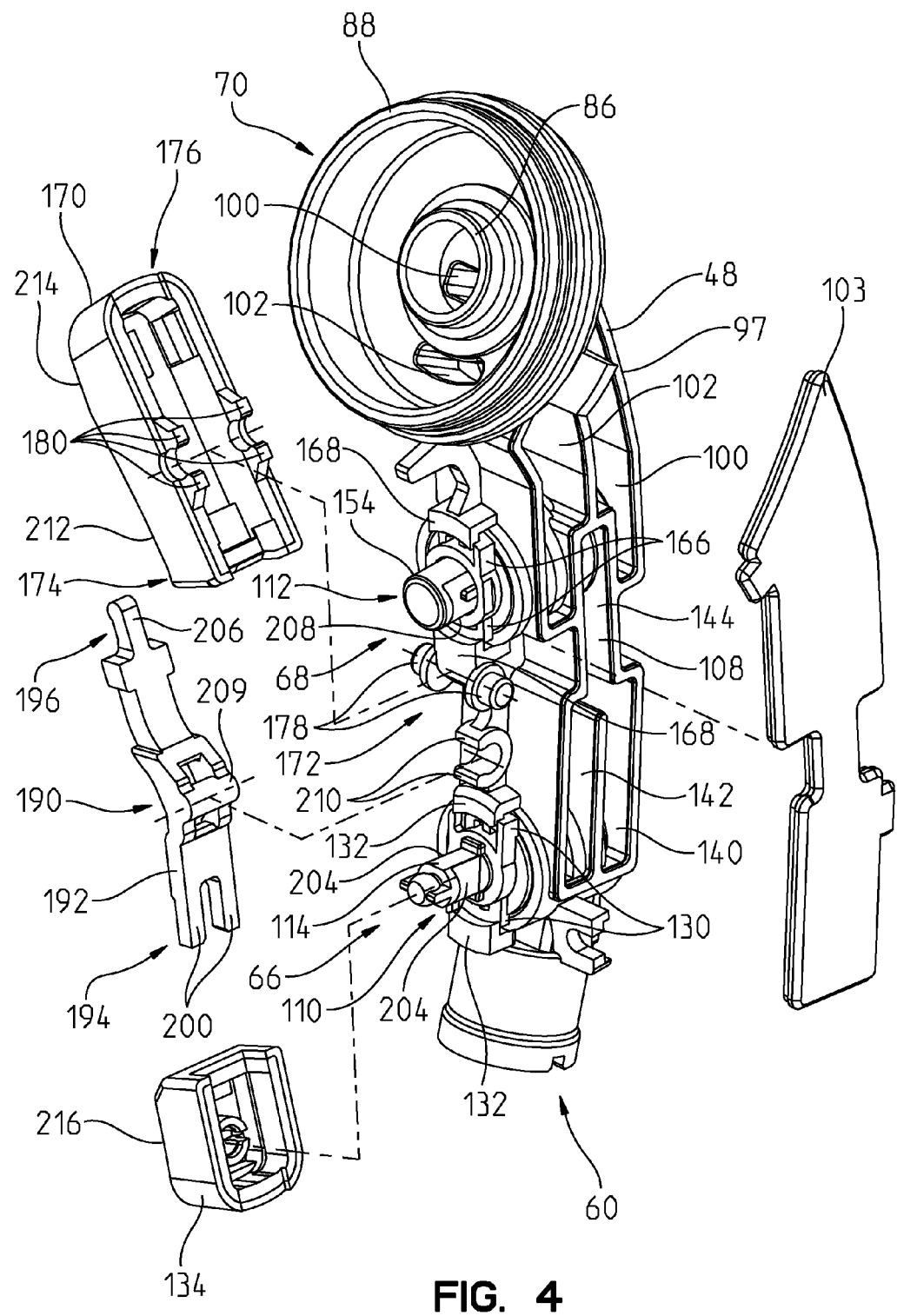
FIG. 4 is a detailed partially exploded perspective view of the multi-function pull-out wand of FIG. 2.

Referring to FIGS. 4 and 7, the retainer housing 116 includes a pair of tabs 130 which are configured to be secured in position by retainers 132 supported by the waterway 48. More particularly, the tabs 130 may be rotated into alignment below the retainers 132 for securing engagement therewith. A button 134 is coupled to the outer end of the piston 114 for operation by a user. More particularly, depressing the button 134 forces the piston 114 inwardly against the bias of the spring 128 (i.e., from the first position (FIG. 7) toward the second position (FIG. 8)).

In the illustrative embodiment of FIGS. 3-9, the intermediate passageway 108 includes a first portion 140 and a second portion 142 connecting at an outlet portion 144. The first portion 140 provides for a first flow rate therethrough, while the second portion 142 provides for a second flow rate therethrough. More particularly, the first portion 140 includes a restriction 146 (FIG. 7) providing a reduced cross-sectional area and thereby reducing the flow rate of fluid therethrough. As such, the first flow rate through first portion 140 is configured to be less than the second flow rate through second portion 142. In the illustrative embodiment, the first flow rate is restricted to be about 1.5 gallons per minute (gpm) at a supplied fluid pressure of 60 pounds per square inch (psi), while the second flow rate is about 2.3 gallons per minute (gpm) at a supplied fluid pressure of 60 psi. The first and second flow rates will vary with pressure, typically between 30 psi and 125 psi.

Figure 9:
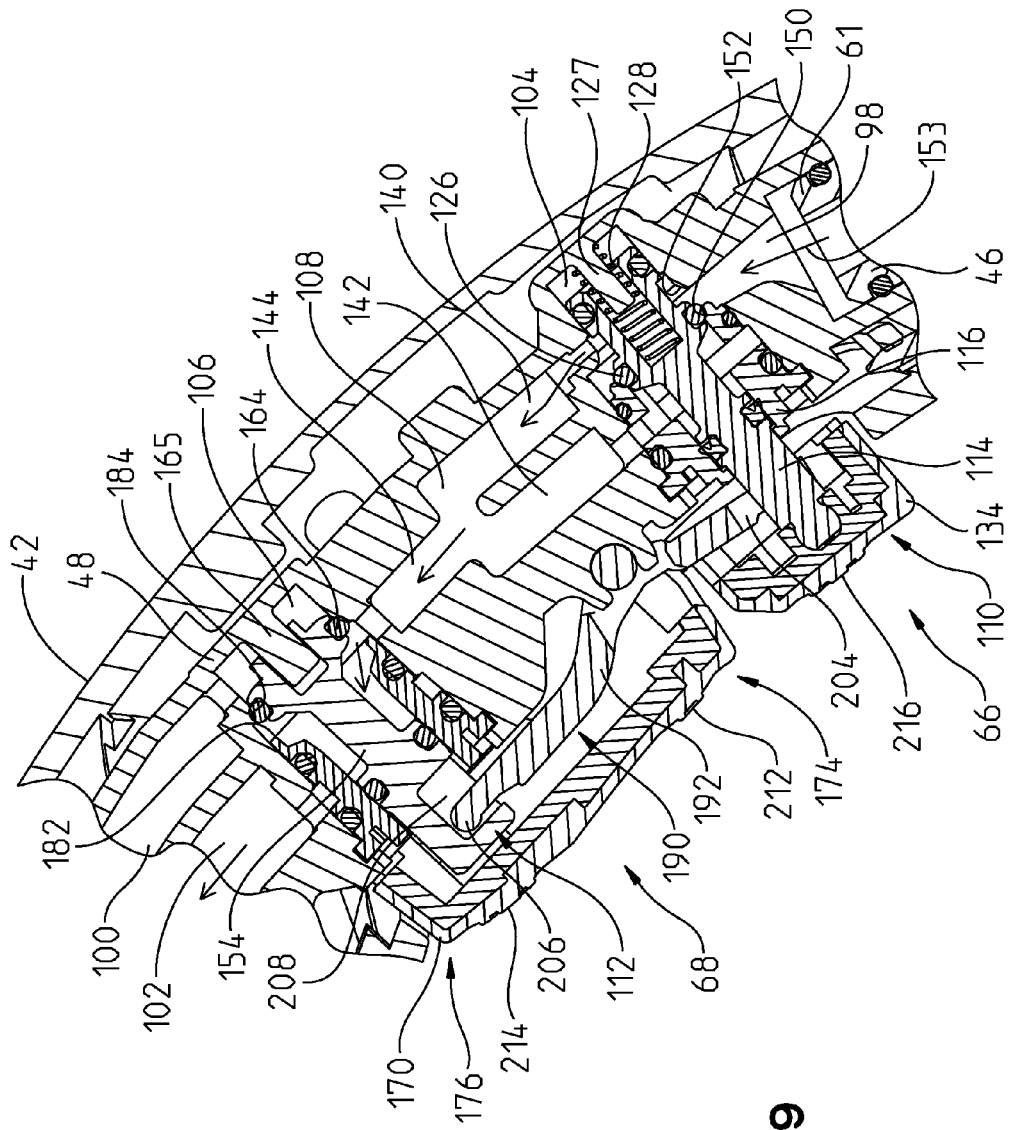
FIG. 9 is a detailed cross-sectional view similar to FIG. 7, showing the mode control piston in a second position for directing water to a second outlet conduit in a spray mode, and the flow control piston in the first position for providing the restricted first flow rate of water.
Figure 10:
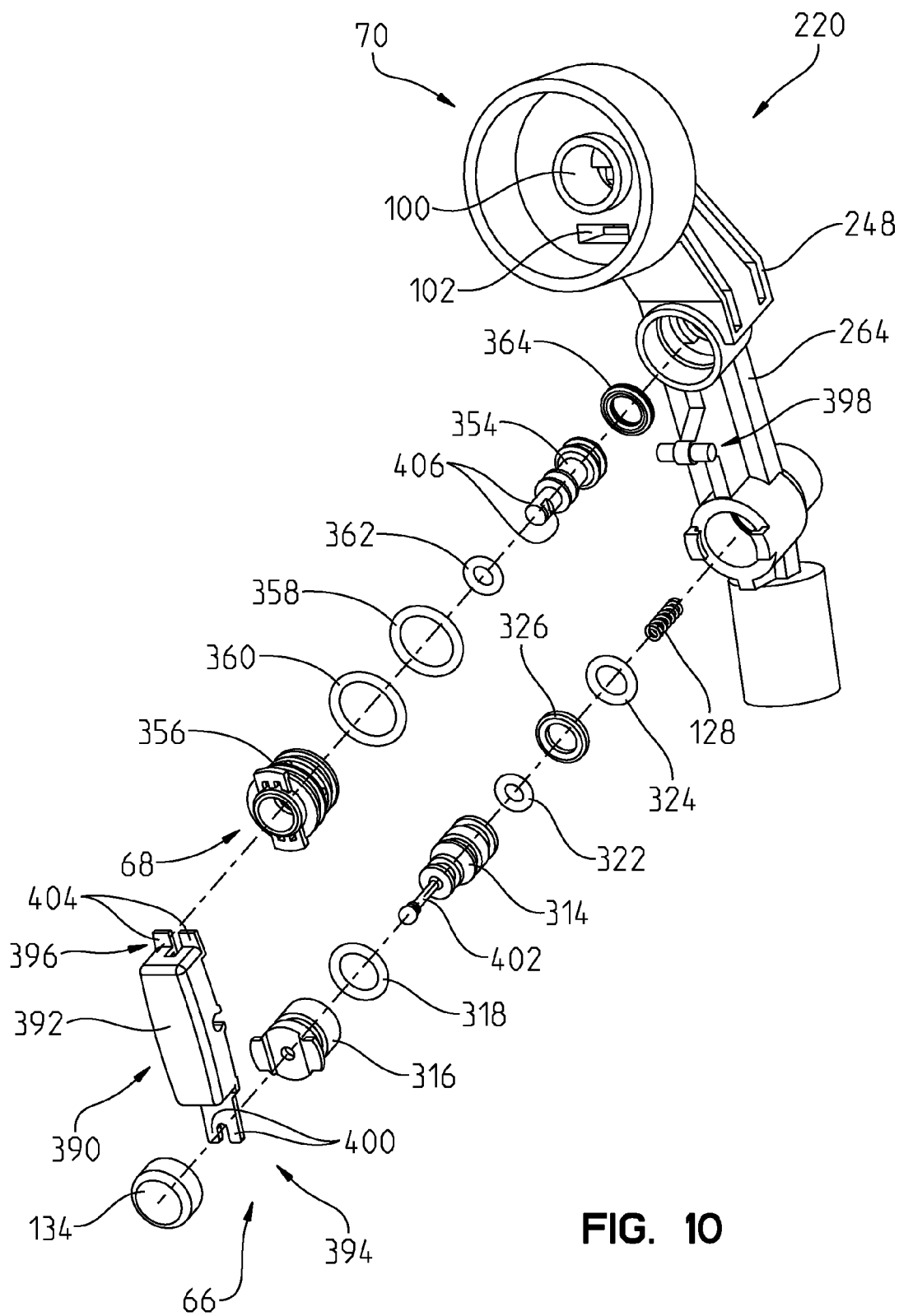
FIG. 10 is a partially exploded prospective view of a further illustrative multi-function pull-out faucet wand of the present disclosure.
Figure 11:
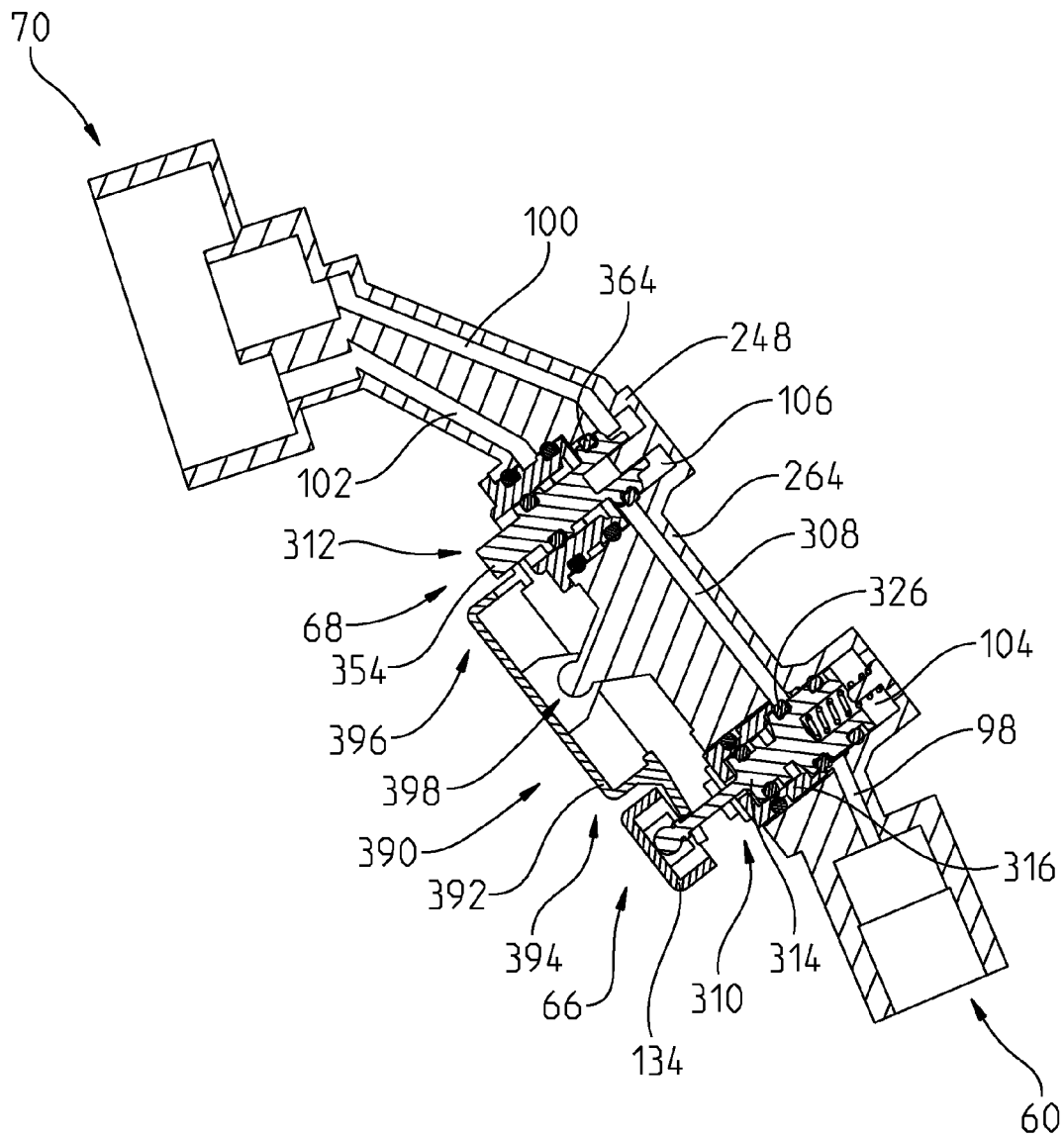
FIG. 11 is a cross-sectional view of the multi-function pull-out wand of FIG. 10.
Figure 12:
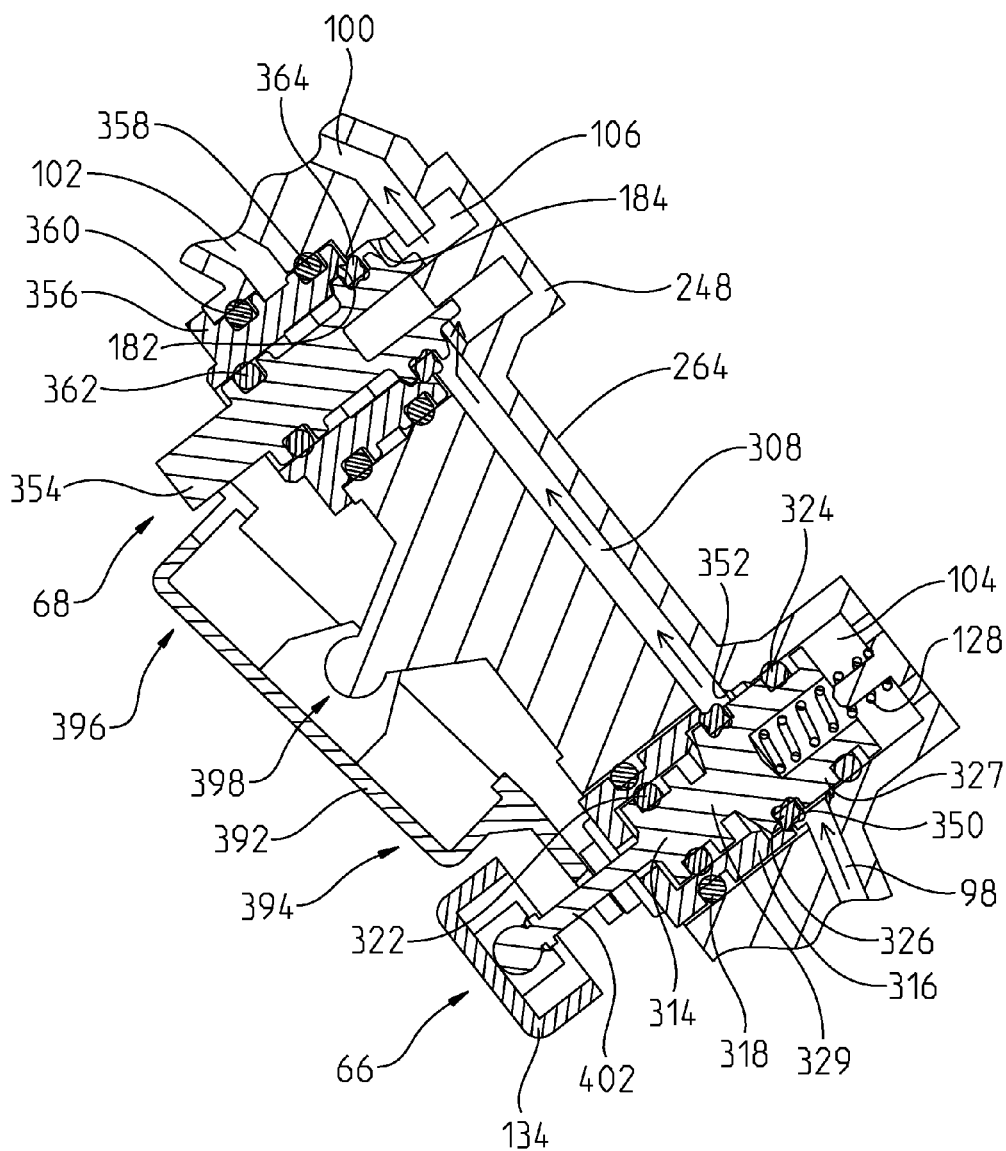
FIG. 12 is a detailed cross-sectional view of FIG. 11, showing the mode control piston in a first position for directing water to a first outlet conduit in a stream mode, and the flow control piston in a first position for providing a restricted first flow rate of water.

With reference to FIGS. 7-9, the control seal 126 is configured to alternatively sealingly engage with valve seats 150 and 152. More particularly, in the first position of the piston 114 as shown in FIGS. 7 and 9, the control seal 126 engages the valve seat 150, such that fluid (represented by arrows 153) passing through the inlet passageway 98 is directed to the first portion 140 of the intermediate passageway 108 and is provided to the mode chamber 106 at the reduced first flow rate. By depressing button 134 against the force of the spring 128, the piston 114 moves from the first (outer) position to the second (inner) position. In the second position of the piston 114 as shown in FIG. 8, the control seal 126 engages the valve seat 152, such that fluid (represented by arrows 153) passing through the inlet passageway 98 is directed to the second portion 142 of the intermediate passageway 108 and is provided to the mode chamber 106 at the increased second flow rate. Fluid pressure acting on a pressure balance surface 153 (FIG. 8) is configured to maintain the piston 114 in the second position by acting against the force of the spring 128. The user is not required to maintain pressure on button 134 to hold the flow control piston 114 in the second position, since back pressure in the flow chamber 104 keeps the piston 114 in the second position. When the fluid pressure is reduced (e.g., turning water off at the mixing valve 24), the spring 128 causes piston 114 to return to the first position.

With reference to FIGS. 6-9, the mode control valve 112 illustratively includes a mode control or diverter piston 154 secured for sliding movement within the mode chamber 106 by a retainer housing 156. The mode control piston 154 is configured to move between a first or outer position (FIGS. 7 and 8) and a second or inner position (FIG. 9). A pair of seals 158 and 160, illustratively o-rings, are positioned intermediate the retainer housing 156 and the waterway 48. An outer seal 162 is supported by the piston 154 for sliding movement within the housing 156, while an inner control seal 164 is supported by the piston 154 for controlling fluid flow through the mode chamber 106 from the intermediate passageway 108 to one of the first and second outlet passageways 100 and 102. A guide post 165 is received within the inner end of the piston 154 for providing support to, and guiding movement of, the piston 154 within the mode chamber 106.

Referring to FIGS. 4 and 7, the retainer housing 156 includes a pair of tabs 166 which are configured to be secured in position by retainers 168 supported by the waterway 48. More particularly, the tabs 166 may be rotated into alignment below the retainers 168 for securing engagement therewith. A lever or rocker switch 170 is secured to the outer end of the piston 154 for operation by a user. The rocker switch 170 is coupled to the waterway 48 at a pivot coupling 172 positioned intermediate first and second ends 174 and 176. With further reference to FIG. 4, the second end 176 of the rocker switch 170 is coupled to the mode control piston 154. The pivot coupling 172 includes pins 178 supported by the waterway 48 operably coupled to arcuate arms 180 supported by the switch 170. More particularly, the arms 180 receive, and are illustratively snap-fit over, the pins 178 to permit pivoting movement therebetween.

With reference to FIGS. 7-9, the control seal 164 is configured to alternatively sealingly engage with valve seats 182 and 184. More particularly, in the first position of the piston 154 as shown in FIGS. 7 and 8, the control seal 164 engages the valve seat 182, such that fluid (represented by arrows 153) passing through the intermediate passageway 108 is directed to the first outlet passageway 100 and to the aerator 92 for delivering water in a stream mode of operation. In the second position of the piston 154 as shown in FIG. 9, the control seal 164 engages the valve seat 184, such that fluid (represented by arrows 153) passing through the intermediate passageway 108 is directed to the second outlet passageway 102 and to the sprayer member 76 for delivering water in a spray mode of operation.

With reference to FIGS. 4 and 7-9, an interlock 190 is operably coupled to the flow control piston 114 and the mode control piston 154. The interlock 190 is illustratively configured to restrain the flow control piston 114 in the first (outer) position (i.e., low flow rate of water) when the mode control piston 154 is in the second (inner) position (i.e., discharging the spray of water). In other words, the flow control piston 114 is movable to the second (inner) position for providing the increased second flow rate of water only when the mode piston 154 is in the first (outer) position for discharging the stream of water. Illustratively, the interlock 190 includes a rocker arm 192 pivotally supported by the waterway 48. The rocker arm 192 includes opposing first and second ends 194 and 196 positioned on opposing sides of a pivot coupling 198. The first end 194 is configured to selectively move with the flow control piston 114, while the second end 196 is configured to move with the mode control piston 154. More particularly, the first end 194 of rocker arm 192 includes a pair of spaced-apart arms 200 that are secured within cooperating recesses or slots 204 formed within the flow control piston 114 (FIGS. 4, 5, and 7). The second end 196 of rocker arm 192 includes an arm 206 supported for limited travel within a slot 208 formed within the mode control piston 154 (FIGS. 4, 6, and 7). The pivot coupling 198 is defined by a pin 209 formed within the rocker arm 192 snap-fit between a pair of arcuate receiving arms 210 supported by the waterway 48 for pivoting movement therebetween.

With reference to FIGS. 4 and 9, a user interface is defined by a first input portion 212 proximate the first end 174 of the rocker switch 170, and a second input portion 214 proximate the second end 176 of the rocker switch 170. Depressing the first input portion 212 causes the mode control piston 154 to be in the first position (FIGS. 7 and 8) for discharging an aerated stream of water. Depressing the second input portion 214 causes the mode control piston 154 to be in the second position (FIG. 9) for discharging a spray of water. The user interface is further defined by a third input portion 216 at button 134. Depressing the third input portion 216 at button 134 moves the flow control piston 114 to the second position (FIG. 8) for providing the increased second flow rate of water.

With reference to FIGS. 1-9, an illustrative method of operation of the multi-function pull-out wand 20 is shown. With reference to FIG. 3, water from the flexible inlet tube 38 enters the control waterway 46 by passing through the connector waterway 48. The flow control piston 114 controls the flow rate of water passing through the flow chamber 104. In FIG. 7, the flow control piston 114 is in the first or outer position such that water flows through restricted portion 140 of passageway 108 at the reduced first flow rate. Water continues to flow through the outlet portion 144 of connecting passageway 108 to the mode chamber 106. The mode control piston 154 then determines whether the fluid enters the first outlet passageway 100 or the second outlet passageway 102.

With further reference to FIG. 7, the piston 154 is in the first or outer position such that water travels to the first outlet passageway 100 and to the aerator 92 for discharge as an aerated stream of water, thereby defining the aerated or stream mode of operation. In FIG. 8, the third input portion 216 at flow control button 134 is depressed such that the flow control piston 114 is moved to the second or inner position. As such, water is directed to the second or unrestricted portion 142 of passageway 108 to discharge water at the increased second flow rate. Water continues to the mode chamber 106, where it again passes through the first outlet passageway 100 and to the aerator 92 for discharge as an aerated stream of water.

In FIG. 9, the second input portion 214 proximate the second end 176 of the mode switch 170 is depressed such that the mode control piston 154 moves inwardly to the second or inner position. The mode control piston 154 simultaneously causes the rocker arm 192 of interlock 190 to rotate about pivot coupling 198, due to engagement with the arm 206 within slot 208, such that the arms 200 at the first end 194 move the flow control piston 114 to the first or outer position. As such, the water returns to the reduced first flow rate by passing through the restricted flow passageway 140. Water continues to flow over the mode control piston 154 and out through the second outlet passageway 102 to the sprayer member 76, thereby defining the spray mode of operation. In other words, by moving the mode control piston 154 to the second position to cause a spray of water to discharge from the outlet end 70, the flow control piston 114 is automatically and simultaneously moved to the first position from the second position to cause the water to discharge from the outlet end 70 at the reduced flow rate.

When in the spray mode of operation of FIG. 9, depressing the third input portion 216 at flow control button 134 will cause the flow control piston 114 to move to the second or inner position of FIG. 8. Water will therefore be directed to the second or unrestricted portion 142 of passageway 108 to discharge water at the increased second flow rate. Movement of the flow control piston 114 simultaneously causes the rocker arm 192 of interlock 190 to rotate about pivot coupling 198, due to the coupling of arms 200 at first end 194 of rocker arm 192 to the piston 114. As a result of engagement between the arm 206 at the second end 196 of the rocker arm 192 and the mode control piston 154, the piston 154 is pulled outwardly to the first or outer position of FIG. 8. Water is therefore directed to the first outlet passageway 100 and to the aerator 92 for discharge as an aerated stream of water. In other words, by moving the flow control piston 114 to the second position to cause the increase second flow rate, the mode control piston 154 is automatically and simultaneously moved from the second position to the first position to cause water to discharge from the outlet end 70 in the spray mode.

Referring now to FIGS. 10-14, a further illustrated embodiment of the multi-function pull-out wand 220 of the present disclosure is shown. Pull-out wand 220 has many similar features as pull-out wand 20 as detailed above with respect to FIGS. 1-9. As such, in the following description similar components are identified with like reference numbers.

The pull-out wand 220 includes a control waterway 248 defining a valve housing 264 supporting flow control 66 and mode control 68. The downstream or outlet end 70 of the waterway 248 is configured to receive a spray face assembly 72 including sprayer member 76 and aerator 92 as further detailed in connection with the embodiment of FIG. 2. The control waterway 248 includes inlet passageway 98, first outlet passageway 100, and second outlet passageway 102. The first outlet passageway 100 is fluidly coupled to the aerator 92, and the second outlet passageway 102 is fluidly coupled to the sprayer member 76. A flow chamber 104 is fluidly coupled to the inlet passageway 98, and a mode chamber 106 is fluidly coupled to the first outlet passageway 100 and the second outlet passageway 102. An intermediate passageway 308 is fluidly coupled between the flow chamber 104 and the mode chamber 106. A flow control valve 310 is supported by the flow chamber 104, while a mode control valve 312 is supported by the mode chamber 106.

Figure 13:
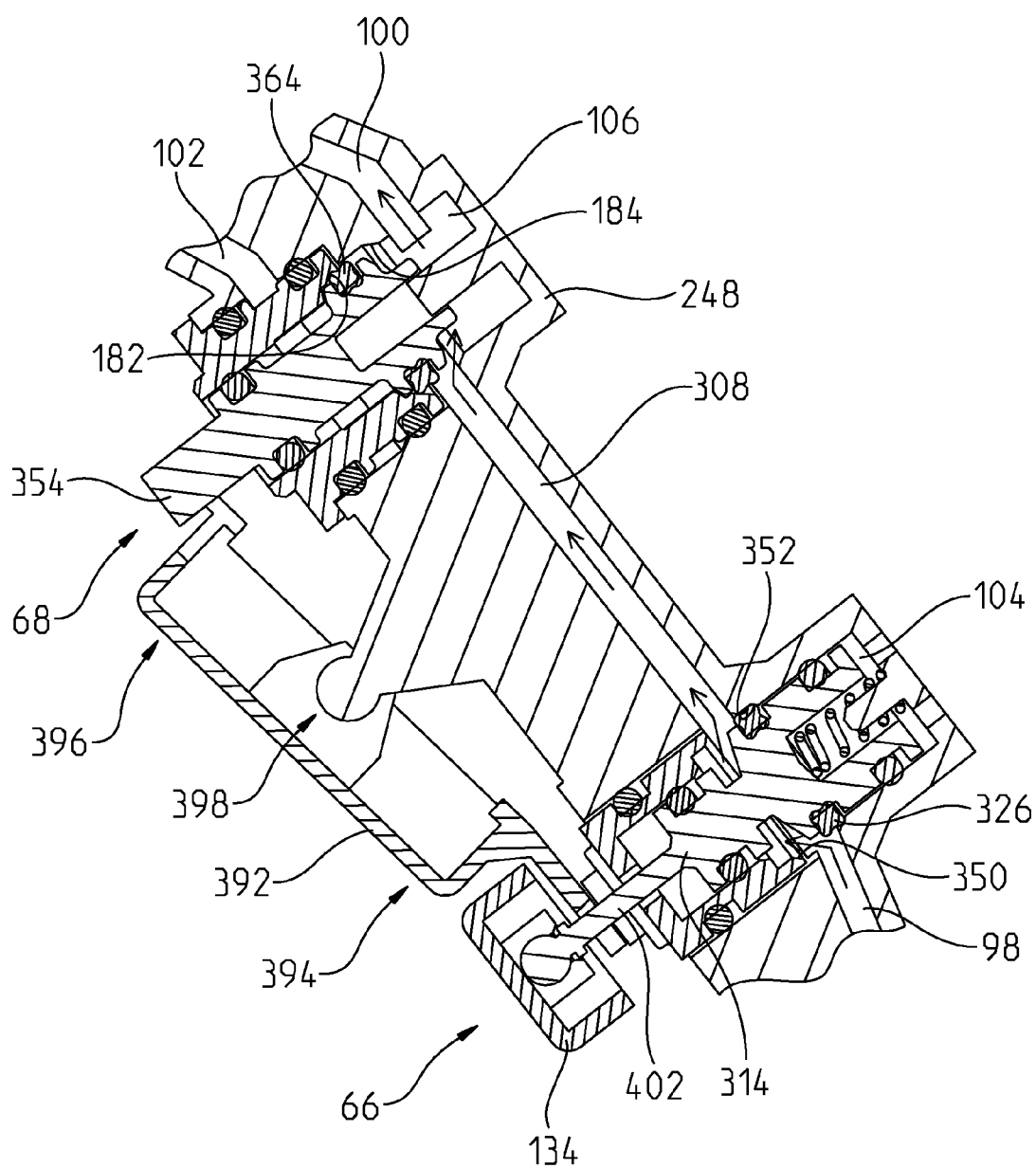
FIG. 13 is a detailed cross-sectional view similar to FIG. 12, showing the mode control piston in the first position for directing water to a first outlet conduit in the stream mode, and the flow control piston in a second position for providing a second flow rate of water.

The flow control valve 310 illustratively includes a flow control piston 314 secured for sliding movement within the flow chamber 104 by a retainer housing 316. The flow control piston 314 is configured to move between a first or outer position (FIGS. 12 and 14) and a second or inner position (FIG. 13). A seal 318, illustratively an o-ring, is positioned intermediate the retainer housing 316 and the waterway 248. A first or outer seal 322 is supported by the piston 314 for sliding movement within the housing 316, while a second or inner seal 324 is supported by sliding movement within the flow chamber 104. A control seal 326 is positioned intermediate the outer seal 322 and the inner seal 324 and is configured to control fluid flow through the flow chamber 104 from the inlet passageway 98 and the intermediate passageway 308. A spring 128 is operably coupled to the flow control piston 314 and is configured to bias the piston 314 in the first position.

In the illustrative embodiment of FIGS. 10-14, the flow control piston 314 includes a first control portion 327 and a second control portion 329, wherein the second control portion 329 has a reduced cross-sectional area to provide increase fluid flow through the flow chamber 104. More particularly, the first control portion 327 provides a restriction for water passing through the flow chamber 104, while the second control portion 329 provides for an increased cross-sectional flow area therethrough.

The control seal 326 is positioned intermediate the first and second controls portions of the piston 314 and is configured to alternatively sealingly engage with valve seats 350 and 352. More particularly, in the first position of the piston 314 (FIGS. 12 and 14), the control seal 326 engages the valve seat 350 such that water from the inlet passageway 98 flows through the passageway defined by the first control portion 327 of the piston 314. As such, water is directed to the intermediate passageway 308 and is provided to the mode chamber 106 at the reduced first flow rate. In the second position of the piston 314 (FIG. 13), the control seal 326 engages the valve seat 352, such that water from the inlet passageway 98 flows through the passageway defined by the second control portion 329 of the piston 314. As such, water is directed to the intermediate passageway 308 and is provided to the mode chamber 106 at the increased second flow rate.

Figure 14:
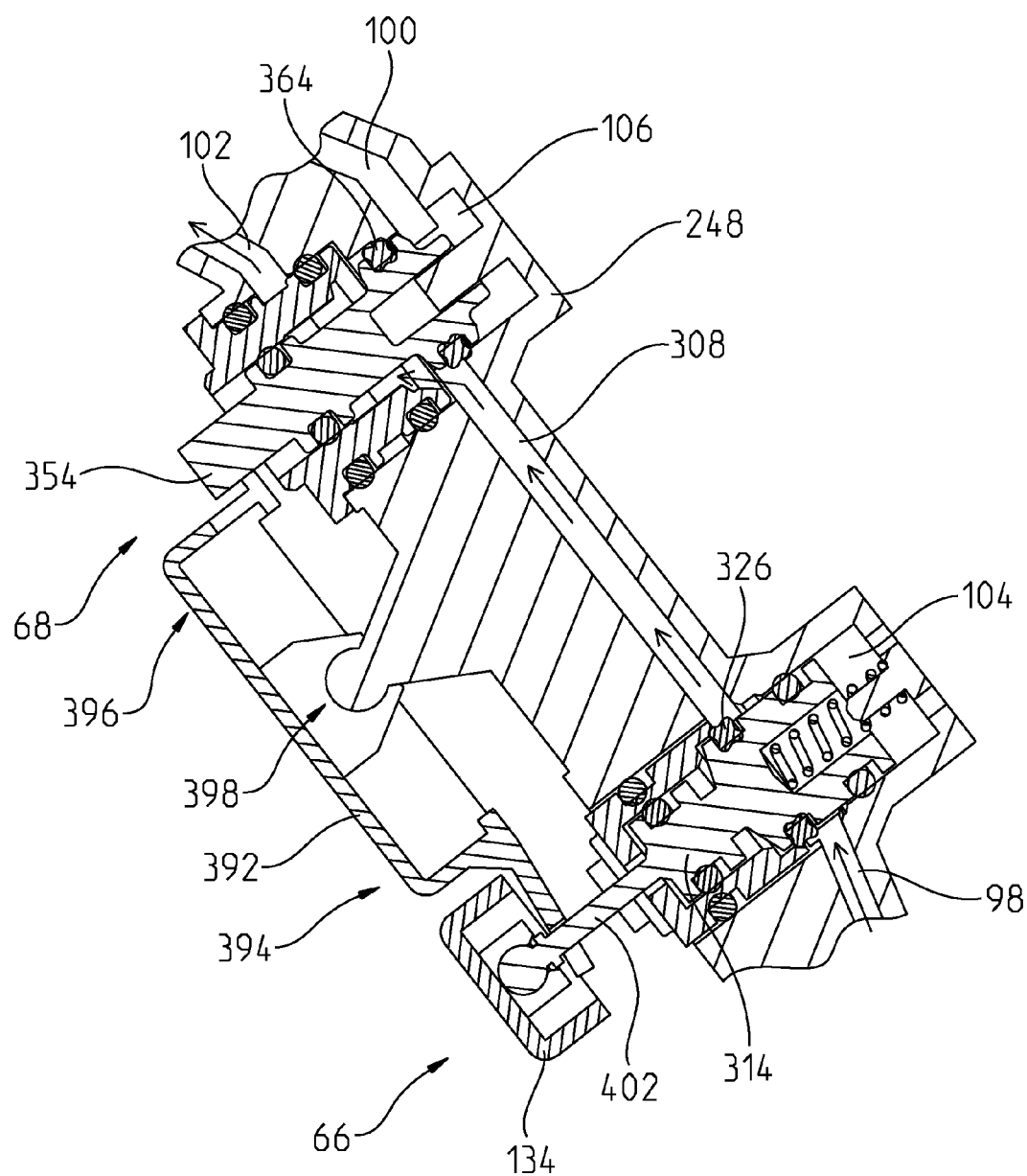
FIG. 14 is a detailed cross-sectional view similar to FIG. 12, showing the mode control piston in a second position for directing water to a second outlet conduit in a spray mode, and the flow control piston in the first position for providing the restricted first flow rate of water.

The mode control valve 312 illustratively includes a mode control or diverter piston 354 secured for sliding movement within the mode chamber 106 by a housing 356. The mode control piston 354 is configured to move between a first or outer position (FIGS. 12 and 13) and a second or inner position (FIG. 14). A pair of seals 358 and 360, illustratively o-rings, are positioned intermediate the housing 356 and the waterway 248. An outer seal 362 is supported by the piston 354 for sliding movement within the housing 356, while a control seal 364 is supported by the piston 354 for controlling fluid flow through the mode chamber 106 from the intermediate passageway 308 to one of the first and second passageways 100 and 102.

Interlock 390 is operably coupled to the flow control piston 314 and the mode control piston 354 and is illustratively configured to limit the flow control piston 314 to the reduced first flow rate of water when the mode control piston 354 is in the second position for discharging the spray of water. Illustratively, the interlock 390 includes a rocker arm 392 pivotally supported by the waterway 248. The rocker arm 392 includes opposing first and second ends 394 and 396 positioned on opposing sides of a pivot coupling 398. The first end 394 is coupled to move with the mode control piston 354, while the second end 396 is configured to selectively move with the flow control piston 314. Illustratively, the first end 394 of rocker arm 392 includes a pair of arms 400 supported for limited travel along a rod 402 of the flow control piston 314. A second end 396 of rocker arm 392 includes a pair of arms 404 that are secured to cooperating recesses or slots 406 formed within the mode control piston 354.

As such, the mode control piston 354 causes the second end 396 of the rocker arm 392 to move about pivot coupling 398 such that the first end 394 moves in an opposite direction. When the mode control piston 354 is in the second or inner position (FIG. 14), the rocker arm 392 is positioned outwardly relative to the rod 402 of the flow control piston 314. When button 134 is depressed to move the flow control piston 314 from the first (outer) position to the second (inner) position, thereby increasing water flow, the rocker arm 392 is pivoted (counter-clockwise from the position in FIG. 14 to the position in FIG. 13). In response, the second end 396 of rocker arm 392 pulls the mode control piston 354 outwardly to the first or outer position (FIG. 13), and water is diverted from the second outlet passageway 102 (spray mode) to the first outlet passageway 100 (stream mode). Once in the position of FIG. 13, subsequent depression of the second end 396 of the rocker arm 392 causes the first end 394 to pivot outwardly away from the second end (clockwise in FIG. 13) thereby causing the first end 394 of the rocker arm 392 to force the button 134 outwardly and causing the flow piston 314 to switch back to the restricted first flow rate. If the water is no longer supplied to the inlet passageway 98 when the pull-out wand 220 is in the configuration of FIG. 13, the spring 128 will bias the flow control piston 314 outwardly to the first position of FIG. 12.

Although the invention has been described in detail with reference to certain preferred embodiments, variations and modifications exist within the spirit and scope of the invention as described and defined in the following claims.

The invention claimed is:

1. A multi-function faucet wand comprising:
    a waterway including an inlet passageway, a first outlet passageway, and a second outlet passageway;
    a mode control including a valve operably coupled to the waterway and movable in response to user input from a first position for directing water to the first outlet passageway in a stream mode for discharging a stream of water, to a second position for directing water to the second outlet passageway in a spray mode for discharging a spray of water;
    a flow control including a valve operably coupled to the waterway and movable in response to user input from a first position for providing a first flow rate of water to the mode control, to a second position for providing a second flow rate of water to the mode control, the first flow rate being less than the second flow rate; and
    wherein the valve of the flow control is movable to the second position for providing the second flow rate of water only when the valve of the mode control is in the first position for discharging the stream of water.

2. The multi-function faucet wand of claim 1, wherein the flow control is configured to allow a user to manually select one of the second flow rate and the first flow rate when the mode control is in the stream mode, and is limited to only the first flow rate when the mode control valve is in the spray mode.

3. The multi-function wand of claim 2, wherein the first flow rate is restricted to 1.5 gallons per minute at a fluid pressure of 60 pounds per square inch.

4. The multi-function wand of claim 1, further comprising an interlock operably coupled to the valve of the mode control and the valve of the flow control, the interlock configured to restrain the valve of the flow control to the first flow rate of water when the valve of the mode control is in the second position for discharging the spray of water.

5. The multi-function wand of claim 4, wherein the valve of the mode control includes a mode control piston slidably supported by the waterway, the valve of the flow control includes a flow control piston slidably supported by the waterway, and the interlock includes a pivotally supported rocker arm operably coupled to the mode control piston and the flow control piston.

6. The multi-function wand of claim 5, wherein the flow control piston includes a control portion having a reduced cross-sectional area to provide the second flow rate when in the second position.

7. The multi-function wand of claim 5, wherein the waterway includes a flow chamber fluidly coupled to the inlet passageway, and a mode chamber fluidly coupled to the flow chamber, the flow control piston being received within the flow chamber, and the mode control piston being received within the mode chamber, and an intermediate passageway is fluidly coupled between the flow chamber and the mode chamber.

8. The multi-function wand of claim 5, wherein the rocker arm includes first and second ends on opposing sides of a pivot coupling, the second end being configured to move with one of the flow control piston and the mode control piston, and the first end being configured to selectively move independent of the other of the mode control piston and the flow control piston.

9. The multi-function wand of claim 8, wherein the second end of the rocker arm is configured to move with one of flow control piston and the mode control piston in opposing first and second directions, and the first end of the rocker arm is configured to move with the other of the mode control piston and the flow control piston only in a single direction.

10. The multi-function wand of claim 4, wherein the valve of the flow control is biased toward the first position.

11. A multi-function faucet wand comprising:
    a waterway including a mode chamber and a flow chamber;
    a mode control valve operably coupled to the mode chamber and configured to allow a user to manually select between a stream mode for discharging a stream of water, and a spray mode for discharging a spray of water; and
    a flow control valve operably coupled to the flow chamber and configured to allow a user to manually select one of a high flow rate and a low flow rate, the flow control valve being biased to the low flow rate in the absence of water pressure within the flow chamber, wherein the flow control valve is limited to only the low flow rate when the mode control valve is in the spray mode.

12. The multi-function wand of claim 11, wherein:
the waterway includes an inlet passageway, a first outlet passageway, and a second outlet passageway;
the mode control valve is movable in response to user input from a first position for directing water to the first outlet passageway in the stream mode, and a second position for directing water to the second outlet in the spray mode; and
the flow control is movable in response to user input from a first position for providing the low flow rate of water to the mode control, and a second position for providing the high flow rate of water to the mode control.

13. The multi-function wand of claim 11, wherein the low flow rate is restricted to 1.5 gallons per minute at a fluid pressure of 60 pounds per square inch.

14. The multi-function wand of claim 11, further comprising an interlock operably coupled to the mode control valve and the flow control valve, the interlock configured to restrain the flow control valve to the low flow rate of water when the mode control valve is in the second position for discharging the spray of water.

15. The multi-function wand of claim 14, wherein the mode control valve includes a mode control piston slidably supported by the mode chamber, the flow control valve includes a flow control piston slidably supported by the flow chamber, and the interlock includes a pivotally supported rocker arm operably coupled to the mode control piston and the flow control piston.

16. The multi-function wand of claim 15, wherein the flow control piston includes a control portion having a reduced cross-sectional area to provide the high flow rate when in the second position.

17. The multi-function wand of claim 16, wherein an inlet passageway is fluidly coupled to the flow chamber, the mode chamber is fluidly coupled to the flow chamber, the flow control piston is received within the flow chamber, the mode control piston is received within the mode chamber, and an intermediate passageway is fluidly coupled between the flow chamber and the mode chamber.

18. The multi-function wand of claim 15, wherein the rocker arm includes first and second ends on opposing sides of a pivot coupling, the second end being configured to move with one of the flow control piston and the mode control piston, and the first end being configured to selectively move independent of the other of the mode control piston and the flow control piston.

19. The multi-function wand of claim 18, wherein the second end of the rocker arm is configured to move with one of the flow control piston and the mode control piston in opposing first and second directions, and the first end of the rocker arm is configured to move with the other of the mode control piston and the flow control piston only in a single direction.

20. The multi-function wand of claim 11, wherein water pressure within the flow chamber acts against the flow control valve for maintaining a previously established high flow rate.

21. The multi-function faucet wand of claim 11, wherein the flow control valve is configured to allow a user to manually select one of the high flow rate and the low flow rate when the mode control is in the stream mode, and is limited to only the low flow rate when the mode control valve is in the spray mode.

22. A multi-function faucet wand comprising:
a waterway;
a mode control including a mode control valve supported for movement relative to the waterway, a first input portion, and a second input portion, wherein user input at the first input portion positions the mode control valve in a first position for discharging a stream of water, and user input at a second input portion positions the mode control valve at a second position for discharging a spray of water;
a flow control fluidly coupled to the mode control and including a flow control valve supported for movement relative to the waterway, and a third input portion, wherein user input at the third input portion is configured to move the flow control valve from a first position for providing a first non-zero flow rate of water, to a second position for providing a second non-zero flow rate of water, the first flow rate being less than the second flow rate; and
an interlock operably coupled to the mode control valve and the flow control valve, the interlock configured to cause selective movement of one of the mode control valve and the flow control valve in response to movement of the other of the flow control valve and the mode control valve.

23. The multi-function wand of claim 22, wherein the mode control valve includes a mode control piston slidably supported by the waterway, the flow control valve includes a flow control piston slidably supported by the waterway, and the interlock includes a pivotally supported interlock rocker arm operably coupled to the mode control piston and the flow control piston.

24. The multi-function wand of claim 23, wherein the flow control piston includes a control portion having a reduced cross-sectional area to provide the second flow rate when in the second position.

25. The multi-function wand of claim 22, wherein the interlock is configured to limit the flow control valve to only the first position for providing the first flow rate of water when the mode control valve is in the second position for discharging the spray of water.

26. The multi-function wand of claim 22, wherein the flow control valve is biased toward the first position in the absence of water pressure.

27. The multi-function faucet wand of claim 22, wherein the interlock is configured to allow a user to manually select one of the first flow rate of water and the second flow rate of water when the mode control is in the first position for discharging a stream of water, and is limited to only the first flow rate when the mode control valve is in the second position for discharging a spray of water.

28. A faucet comprising:
a spout;
an outlet tube received within the spout;
a mixing valve fluidly coupled to the outlet tube and configured to supply to the outlet tube hot water from a hot water supply and cold water from a cold water supply;
a wand removably supported by the spout and fluidly coupled to the outlet tube, the wand including a mode control configured to allow a user to manually select between a stream mode for discharging a stream of water and a spray mode for discharging a spray of water, and a flow control configured to allow a user to manually select between a high flow rate of water and a low flow rate of water, the flow control configured to allow a user to manually select the high flow rate only when the mode control is in the stream mode.

29. The faucet of claim 28, further comprising:
a waterway including an inlet passageway, a first outlet passageway, and a second outlet passageway;
the mode control including a mode control valve movable in response to user input from a first position for directing water to the first outlet passageway in the stream mode, and a second position for directing water to the second outlet in the spray mode; and
the flow control including a flow control valve movable in response to user input from a first position for providing the low flow rate of water to the mode control, and a second position for providing the high flow rate of water to the mode control.

30. The faucet of claim 29, further comprising an interlock operably coupled to the mode control valve and the flow control valve, the interlock configured to limit the flow control valve to only the low flow rate of water when the mode control valve is in the second position for discharging the spray of water.

31. The faucet of claim 30, wherein the mode control valve includes a mode control piston slidably supported by the waterway, the flow control valve includes a flow control piston slidably supported by the waterway, and the interlock includes a pivotally supported rocker arm operably coupled to the mode control piston and the flow control piston.

32. The faucet of claim 31, wherein the flow control piston includes a control portion having a reduced cross-sectional area to provide the second flow rate when in the second position.

33. The faucet of claim 31, wherein the waterway includes a flow chamber fluidly coupled to the inlet passageway, and a mode chamber fluidly coupled to the flow chamber, the flow control piston being received within the flow chamber, and the mode control piston being received within the mode chamber, and an intermediate passageway is fluidly coupled between the flow chamber and the mode chamber.

34. A method of controlling water flow through a faucet wand, the method comprising the steps of:
positioning a mode control in a first position to cause an aerated stream of water to discharge from an outlet;
positioning a flow control in a first position to cause the aerated stream to discharge from the outlet at a first flow rate;
moving the flow control to a second position to cause the aerated stream to discharge from the outlet at a second flow rate greater than the first flow rate;
moving the mode control to a second position to cause a spray of water to discharge from the outlet; and
simultaneously moving the flow control to the first position to cause the spray to discharge from the outlet at the first flow rate.

35. The method of claim 34, wherein the step of simultaneously moving includes providing an interlock between the mode control and the flow control, wherein the interlock restrain the flow control to the first flow rate when the mode control is in the second position for discharging the spray of water.

36. The method of claim 35, further comprising the step of pivoting the interlock in response to moving the mode control to the second position.

37. The method of claim 36, wherein the mode control valve includes a mode piston slidably supported by the waterway, the flow control valve includes a flow piston slidably supported by the waterway, and the interlock includes a pivotally supported rocker arm operably coupled to the mode piston and the flow piston.

\* \* \* \* \*